United States Patent [19]
Masuda et al.

[11] Patent Number: 5,461,102
[45] Date of Patent: Oct. 24, 1995

[54] AQUEOUS DISPERSION COMPOSITION AND PRODUCTION THEREOF

[75] Inventors: Toshiyuki Masuda; Takanori Hatano; Naotami Ando, all of Hyogo, Japan

[73] Assignee: Kanegafuchi Chemical Industry Co., Ltd., Osaka, Japan

[21] Appl. No.: 88,010

[22] Filed: Jul. 6, 1993

[30] Foreign Application Priority Data

Jul. 7, 1992 [JP] Japan ................... 4-179860

[51] Int. Cl.⁶ ................... C08L 13/02
[52] U.S. Cl. ................... 524/458
[58] Field of Search ................... 524/458, 460, 524/457

[56] References Cited

U.S. PATENT DOCUMENTS 5,162,420  11/1992  Chang et al. ................... 524/458

FOREIGN PATENT DOCUMENTS 2-178301  7/1990  Japan .

OTHER PUBLICATIONS

Chemical Abstracts, vol. 114, No. 6, 11 Feb. 1991, Columbus, Ohio, US; abstract No. 45157, "Emulsion Polymerization of Vinyl Monomers", p. 116, column 2 (JP-A-2 178 301).

*Primary Examiner*—Jeffrey T. Smith
*Attorney, Agent, or Firm*—Jordan and Hamburg

[57] ABSTRACT

A monomer mixture (B) containing a vinyl monomer having a functional silyl group of the general formula (ii) is subjected to emulsion polymerization in an aqueous solution of a water-soluble resin (A) having a functional silyl group of the general formula (i) the water-soluble resin [A] is synthesized using, as a polymerization solvent, a water-soluble organic solvent containing a (poly)ethylene glycol monoalkyl ether of the general formula $HO—(CH_2CH_2O)_n—R^3$ or a (poly)propylene glycol monoalkyl ether of the general formula $HO—(C_3H_6O)_n—R^4$;

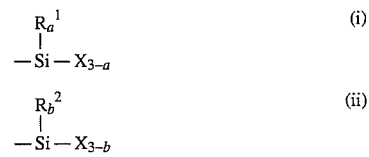

wherein $R^1$ and $R^2$ each independently is a monovalent group selected from the class consisting of alkyl groups containing 1 to 10 carbon atoms, aryl groups and aralkyl groups, X is a group selected from the class consisting of halogen atoms, alkoxy groups, a hydroxy group, acyloxy groups, an aminoxy group, a phenoxy group, thioalkoxy groups and an amino group, a and b each independently is an integer of 0 to 2, $R^3$ and $R^4$ each is an alkyl group containing 1 to 10 carbon atoms and n is an integer of 1 to 10 and wherein, when two or more $R^1$ and/or $R^2$ or X groups are bound to Si, they respectively may be the same or different.

6 Claims, No Drawings

AQUEOUS DISPERSION COMPOSITION AND PRODUCTION THEREOF

BACKGROUND OF THE INVENTION

The present invention relates to an aqueous dispersion composition and a method of producing the same. More particularly, the invention relates to an aqueous dispersion composition suited for use in various fields of painting, for example in decorating the interior and exterior of buildings or decorating automobiles, household electrical appliances, articles made of synthetic resin or the like, and capable of displaying good paint film performance characteristics in those fields of application where weather resistance and durability are required, and to a method of producing such composition.

In recent years, in the field of paints and adhesives, switchover from compositions comprising a resin and an organic solvent to compositions based on a water-soluble resin or water-dispersible resin (hereinafter referred to as "water-compatible resin") has been attempted for reasons of controlling pollution or saving resources.

However, the conventional water-compatible resins are produced exclusively by emulsion polymerization using surfactants and, as a result, cured products (paint films) formed therefrom tend to perform unsatisfactorily in weather resistance, water resistance and stain resistance due to the influences of said surfactants. Another disadvantage is that, owing to the difference in film formation mechanism, the gloss of paint films is inferior as compared with those cases where organic solvents are used.

Attempts have already been made to remove the above drawbacks. Thus, for instance, Japanese Kokai Patent Publication No. 02-178301 proposes a method of producing emulsion polymerizates which comprises subjecting, in an aqueous solution of a water-soluble resin having a hydrolyzable silyl function group, a vinyl monomer having a functional group capable of reacting with said silyl function group to emulsion polymerization.

However, such emulsion polymer having a hydrolyzable silyl function group can readily be crosslinked during polymerization and therefore the film-forming property obtainable therewith is very poor. To solve this problem, a measure is known which comprises adding a film formation aid such as Texanol or butyl carbitol acetate. However, mere addition of such an aid cannot produce a satisfactory level of film-forming ability, since such aid induces aggregation or fusion.

SUMMARY OF THE INVENTION

As a result of their intensive investigations, the present inventors found that when a silyl function-containing water-soluble resin is synthesized in the presence of a water-soluble film formation aid and a monomer mixture containing a vinyl monomer having a functional silyl group is subjected to emulsion polymerization in an aqueous solutiuon of said resin, a water-dispersible resin can be synthesized in a stable manner without causing gelation during synthesis and the composition thus obtained has good film-forming ability and storage stability and, further, that the paint films formed by said composition are excellent in physical properties, inclusive of weather resistance, water resistance and stain resistance.

The present invention provides an aqueous dispersion composition obtained by subjecting a monomer mixture (B) containing a vinyl monomer having a functional silyl group of the general formula

to emulsion polymerization in an aqueous solution of a water-soluble resin (A) containing a functional silyl group of the general formula

as synthesized using, as a polymerization solvent, a water-soluble solvent comprising a (poly)ethylene glycol monoalkyl ether of the general formula $HO\!-\!(CH_2CH_2O)_n\!-\!R^3$ or a (poly)propylene glycol monoalkyl ether of the general formula $HO\!-\!(C_3H_6O)_n\!-\!R^4$ ($C_3H_6$ being a propylene group), wherein, in the above formulas, $R^1$ and $R^2$ each independently is a monovalent group selected from the class consisting of alkyl groups containing 1 to 10 carbon atoms, aryl groups and aralkyl groups, X is a group selected from the class consisting of halogen atoms, alkoxy groups, a hydroxy group, acyloxy groups, an aminoxy group, a phenoxy group, thioalkoxy groups and an amino group, a and b each independently is an integer of 0 to 2, $R^3$ and $R^4$ each is an alkyl group containing 1 to 10 carbon atoms and n is an integer of 1 to 10 and wherein, when two or more $R^1$ and/or $R^2$ or X groups are bound to Si, they respectively may be the same or different.

The invention also provides a method of producing such aqueous dispersion composition which comprises synthesizing a water-soluble resin (A) having a silyl group of the above general formula (i) using the above-mentioned water-soluble organic solvent as a polymerization solvent and then subjecting a monomer mixture (B) containing a vinyl monomer having a silyl group of the above general formula (ii) to emulsion polymerization in an aqueous solution of said water-soluble resin (A).

DETAILED DESCRIPTION OF THE INVENTION

Synthesis of silyl group-containing water-soluble resin (A).

In the following, mention is made of the silyl group-containing water-soluble resin, namely component (A).

The component (A) in accordance with the invention is a vinyl copolymer the main chain of which is substantially a vinyl polymer chain and which contains a silyl group of the general formula (i) given hereinabove, the number of silicon atoms bound to a hydrolyzable group on the main chain and/or side chains being at least 1, preferably 2 to 30, more preferably 2 to 10.

Generally, the component (A) mentioned above can be obtained, for instance, by copolymerizing a vinyl monomer containing a silyl group of the general formula (i) given hereinabove (monomer (C); hereinafter also referred to as "silyl group-containing vinyl monomer" for short) and a vinyl monomer having a water-soluble group or a group capable of forming a water-soluble group (monomer (D)), if necessary together with at least one vinyl monomer (E) copolymerizable with the above-mentioned (C) and (D).

The main chain and/or side chains of the component (A) may partly contain a urethane bond, a siloxane bond or the like.

For rendering the above-mentioned vinyl copolymer soluble in water, a method may be used which comprises incorporating a carboxyl-containing vinyl monomer or basic group-containing vinyl monomer in an amount of 0.5 to 25 parts (relative to 100 parts of the total of monomers; hereinafter the same shall apply), preferably 1 to 15 parts, and neutralizing the carboxyl or basic group before, during or after polymerization with ammonia, an organic amine compound or the like or an acidic compound such as hydrochloric acid or acetic acid, respectively.

As examples of the vinyl monomer (C) containing the silyl group of general formula (i) to be used in synthesizing the water-soluble resin (A) mentioned above, there may be mentioned alkoxysilyl group-containing vinyl monomers, among others.

Particular examples of said alkoxysilyl group-containing vinyl monomers are as follows:

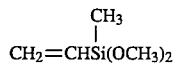

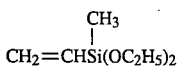

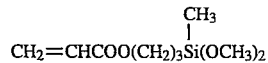

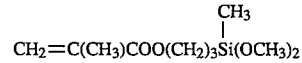

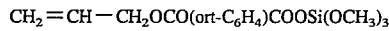

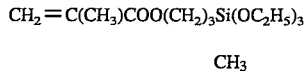

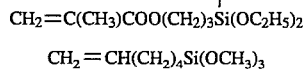

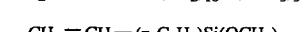

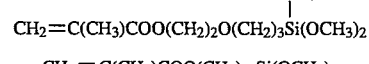

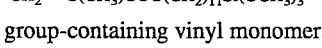

These silyl group-containing vinyl monomers (C) may be used singly or two or more of them may be used in combination.

The proportion of the silyl group-containing vinyl monomer (C) to be used in synthesizing the component (A) is preferably within the range of 0.5 to 50 parts by weight, more preferably 2 to 20 parts by weight, per 100 parts of the total of monomers.

When the proportion of silyl group-containing vinyl monomer (C) is smaller than 0.5 part by weight, the water resistance of paint films will be insufficient while the problem of decreased polymerization stability tends to arise when said proportion is above 50 parts by weight.

As examples of the vinyl monomer (D), which is one of the essential components of the water-soluble resin (A) and contains a water-soluble group or a group capable of forming a water-soluble group, there may be mentioned, among others, carboxyl-containing vinyl monomers, inclusive of acids having a polymerizable carbon-carbon double bond, for example $\alpha,\beta$-ethylenically unsaturated carboxylic acids such as acrylic acid, methacrylic acid (acryl- and methacryl-; hereinafter also refferred to as "(meth)acryl-" for short), maleic acid, maleic anhydride, itaconic acid, itaconic anhydride, crotonic acid, fumaric acid, citraconic acid, etc., styrenesulfonic acid, vinylsulfonic acid and the like; salts of these (alkali metal salts, ammonium salts, amine salts, etc.); acid anhydrides such as maleic anhyddride, and half esters thereof with straight or branched alcohols containing 1 to 20 carbon atoms; amino group-containing (meth)acrylates such as dimethylaminoethyl (meth)acrylate, dimethylaminopropyl (meth)acrylate, diethylaminoethyl (meth)acrylate, etc.; (meth)acrylamide, $\alpha$-ethyl(meth)acrylamide, N-butoxymethyl(meth)acrylamide, N,N-dimethylacrylamine, N-methylacrylamide and acryloylmorpholine, hydrochlorides and acetates of these, and so forth.

The water-soluble resin (A) is preferably the one prepared by polymerization in the acid form followed by neutralization for conversion into a salt, since the functional silyl group contained therein can be maintained stably in that case.

Therefore, the monomer (D) mentioned above is preferably a carboxyl-containing vinyl monomer or an acid anhydride-containing vinyl monomer or a half ester derived therefrom and, among others, carboxyl-containing vinyl monomers such as (meth)acrylic acid are most preferred.

These monomers (D) may be used singly or two or more of them may be used combinedly. The proportion of monomer (D) is preferably within the range of 0.5 to 25 parts by weight, more preferably 1 to 15 parts by weight, per 100 parts of the total of monomers.

When the proportion of monomer (D) is less than 0.5 part by weight, it is difficult to obtain a water-soluble resin (A) sufficiently solubilized in water. Conversely, when said proportion exceeds 25 parts by weight, the emulsion will have a decreased stability.

The other vinyl monomer (E) copolymerizable with the above-mentioned silyl group-containing vinyl monomer (C) and water-soluble group-containing vinyl monomer (D) is not limited to a particular species but may be any vinyl monomer other than (C) and (D). As specific examples, there may be mentioned vinyl monomers such as methyl (meth)acrylate, ethyl (meth)acrylate, butyl (meth)acrylate, isobutyl (meth)acrylate, 2-ethylhexyl (meth)acrylate, stearyl (meth)acrylate, benzyl (meth)acrylate and cyclohexyl (meth)acrylate; fluorine-containing vinyl monomers such as trifluoroethyl (meth)acrylate, pentafluoropropyl (meth)acrylate, perfluorocyclohexyl (meth)acrylate, 2,2,3,3-tetrafluoropropyl methacrylate, $\beta$-(perfluorooctyl)ethyl (meth)acrylate, hexafluoropropylene, chlorotrifluoroethylene, vinylidene fluoride, trifluoroethylene,, tetrafluoroethylene and pentafluoropropylene; aromatic hydrocarbon vinyl monomers such as styrene, $\alpha$-methylstyrene, chlorostyrene, 4-hydroxystyrene and vinyl-toluene; vinyl esters and allyl compounds such as vinyl acetate, vinyl propionate and diallyl phthalate; nitrile group-containing vinyl monomers such as (meth)acrylonitrile; epoxy group-containing vinyl monomers such as glycidyl (meth)acrylate; hydroxy group-containing vinyl monomers such as 2-hydroxyethyl (meth- )acrylate, 2-hydroxypropyl (meth)acrylate, 2-hydroxyethyl vinyl ether, N-methylol(meth)acrylamide, hydroxystyrene, Aronix 5700 (trademark; product of Toagosei Chemical Industry Co., Ltd.), Placcel FA-1, Placcel FA-4, Placcel FM-1, Placcel FM-4 (trademarks; products of Daicel Chemical Industries, Ltd.), HE-10, HE-20, HP-10, HP-20 (trademarks; products of Japan Catalytic Chemical Industry Co., Ltd.), Blemmer PP series, Blemmer PE series, Blemmer PEP series, Blemmer AP-400, Blemmer AE-350, Blemmer NKH-5050, Blemmer GLM (trademarks; products of Nippon Oil & Fats Co., Ltd. ) and hydroxy-containing vinyl type modified hydroxyalkyl vinyl monomers; hydroxyalkyl esters of $\alpha,\beta$-ethylenically unsaturated carboxylic acids, such as hydroxyalkyl esters of (meth)acrylic acid, phosphate ester group-containing vinyl compounds, urethane bond- or siloxane bond-containing (meth)acrylates and the like vinyl compounds; macromonomer compounds such as AS-6, AN-6, AA-6, AB-6 and AK-5 (trademarks; products of Toagosei Chemical Industry Co., Ltd.); and other vinyl monomers such as vinyl methyl ether, vinyl chloride, vinylidene chloride, chloroprene, propylene, butadiene, N-vinylimidazole and vinylsulfonic acid.

The copolymerization of the monomers (C) to (E) mentioned above may be carried out in the conventional manner, for example in the manner of emulsion polymerization, suspension polymerization or solution polymerization. The solution polymerization method is preferred because of easy operability, however.

In carrying out the solution polymerization, an organic solvent is used as a polymerization solvent.

This solvent should preferably be capable of dissolving the copolymerization reaction product, soluble in water and capable of markedly improving the film-forming ability of said product.

Examples of the organic solvent (F) are (poly)ethylene glycol monoalkyl ethers of the general formula $HO-(CH_2CH_2O)_n-R^3$ or (poly)propylene glycol monoalkyl ethers of the general formula $HO-(C_3H_6O)_n-R^4$, in which $R^3$ and $R^4$ each is an alkyl group containing 1 to 10 carbon atoms and n is an integer of 1 to 10, and, more specifically, include, among others, such ethers as methyl cellosolve, ethyl cellosolve, butyl cellosolve, diethylene glycol monoethyl ether, diethylene glycol monobutyl ether, propylene glycol monoethyl ether, propylene glycol monobutyl ether, propylene glycol monoisobutyl ether, dipropylene glycol monoethyl ether, dipropylene glycol monobutyl ether, dipropylene glycol monoisobutyl ether, tripropylene glycol monoethyl ether, tripropylene glycol monobutyl ether and tripropylene glycol monoisobutyl ether.

The amount of such organic solvent to be used is not limited to any particular level. Generally, however, said solvent is used in an amount of 40 to 300 parts by weight per 100 parts by weight of the total of the monomers.

When the amount of the solvent is less than 40 parts by weight, the problem of insufficient film-forming ability tends to arise. If, conversely, the solvent is used in excess of 300 parts by weight, undesirably soft paint films will be obtained.

The following solvents may be used combinedly with the above-mentioned glycol ethers: alcohols such as methanol, isopropyl alcohol and butanol; glycol ether esters such as butyl cellosolve acetate, diethylene glycol monobutyl ether acetate, dipropylene glycol monobutyl ether acetate, tripropylene glycol monobutyl ether acetate and tripropylene glycol monoisobutyl ether acetate; 2,2,4-trimethyl-1,3-pentanediol monoisobutyrate and the like.

The polymerization initiator (G) is not limited to any particular species but may be any of the conventional initiators, inclusive of redox initiators, azo initiators and peroxides. Among them, the azo initiators are preferred and, as specific examples thereof, there may be mentioned, among others, azonitriles such as azobisisobutyronitrile, azobisdimethylvaleronitrile, azobiscyclohexanecarbonitrile, azobismethylbutyronitrile and azobisdimethylmethoxyvaleronitrile; azoamidines such as V-50, VA-041, VA-044 and VA-061 (trademarks; products of Wako Pure Chemical Industries, Ltd.); azoamides such as VA-080, VA-086 and VA-088 (trademarks; products of Wako Pure Chemical Industries, Ltd.); azoalkyls such as azodi-tert-octane and azoditert-butane; cyanopropylazoformamide, azobiscyanovaleric acid, dimethylazobismethyl propionate, azobishydroxymethylpropionitrile and the like.

When necessary, molecular weight adjustment may be made using a chain transfer agent such as n-dodecyl mercaptan, tert-dodecyl mercaptan, n-butyl mercaptan, γ-mercaptopropyltrimethoxysilane, γ-mercaptopropyltriethyoxysilane, γ-mercaptopropylmethyldimethoxysilane, $(CH_3O)_3Si-S-S-Si(OCH_3)_3$, $(CH_3O)_3Si-(CH_2)_3-S-S-(CH_2)_3-Si(OCH_3)_3$ or $(CH_3O)_3Si-S_8-Si(OCH_3)_3$.

As regards the polymerization conditions, the polymerization is desirably carried out at a temperature of 40° to 170° C., preferably 50° to 150° C., for a period of 3 to 24 hours, preferably 4 to 20 hours.

The polymerization product is rendered water-soluble preferably by neutralization of the carboxyl group with an amine compound (H) such as ammonia or an organic amine compound.

Among many kinds of alkaline compounds used to neutralize the carboxyl group, as mentioned above, the amine compound (H) such as ammonia or an organic amine compound is preferably employed for the following reasons. Namely, when an alkali metal salt such as sodium hydroxide is employed, for example, said alkali metal salt remains in the final cured product in a large amount and decreases the water resistance thereof remarkably because the salt tends to absorb water. On the contrary, when ammonia is employed, decreased water resistance is prevented because ammonia is volatilized during the curing process and the amount of it in the cured product decreases. When an organic amine compound is employed, the amount of remainder in the cured product is larger than that of ammonia, however, it is not large enough to deteriorate water resistance of the cured product.

It is possible to prevent increase of the viscosity of a solution (a composition) by maintaining functional silyl group stably. Furthermore, properties of the cured products (paint film) such as film-forming ability or weather resistance are improved by including a large number of stably maintained functional silyl groups.

As typical examples of the amine compound (H), there may be mentioned ammonia, methylamine, dimethylamine, trimethylamine, ethylamine, diethylamine, triethylamine, monomethanolamine, dimethanolamine, trimethanolamine, monoethanolamine, diethanolamine, triethanolamine, dimethylethanolamine and diethylethanolamine, among others.

When the product has a basic group, said group is neutralized and quaternized using an acidic compound such as hydrochloric acid or acetic acid.

The amount of the basic compound or acidic compound to be used for neutralization may be smaller than the equivalent of the target group (for example, carboxyl), or equivalent, or slightly excessive. It is rather preferably, however, to use such compound in an equivalent proportion or in slight excess. From the viewpoints of rate of polymerization, stability of polymerization and stability of hydrolyzable silyl groups, it is recommended that the polymerization product be adjusted to a pH of 5 to 10, preferably a pH of 6 to 8.

The number average molecular weight of the component (A) is preferably 2,000 to 20,000, more preferably 5,000 to 15,000, although it is not critical. When the number average molecular weight is below 2,000, the emulsion tends to have a decreased level of stability. When the molecular weight is above 20,000, the stability of the water-soluble resin is decreased.

Synthesis of aqueous dispersion composition

The desired aqueous dispersion composition can be obtained by subjecting the monomer mixture to polymerization in an aqueous medium containing the thus-obtained copolymer (A) as a dispersion stabilizer. As for the polymerization procedure, ordinary emulsion polymerization procedures can be employed.

Thus, the desired aqueous dispersion composition can be synthesized by copolymerizing the vinyl monomer (I) containing silyl group represented by the above general formula (ii) with another vinyl monomer (J) copolymerizable with said monomer (I) in an aqueous medium containing the component (A) as a dispersion stabilizer.

As specific examples of the component (I) mentioned above, there may be mentioned those examples given above for the silyl group-containing vinyl monomer (C) under the heading "Synthesis of silyl group-containing water-soluble resin (A)". These may be used singly or two or more of them may be used combinedly.

Preferably 1 to 50 parts by weight, more preferably 2 to 20 parts by weight of the component (I) is subjected to copolymerization per 100 parts of the total of vinyl monomers. When the proportion of component (I) is less than 1 part by weight, the water resistance and weather resistance will be poor. When said proportion exceeds 50 parts by weight, the stability of the emulsion will be low.

The component (J) mentioned above is not limited to any particular species. Specific examples include those examples of the vinyl monomer (D) having a water-soluble group or capable of forming a water-soluble group and of the other copolymerizable vinyl monomer (E) as mentioned in the description of "Synthesis of silyl group-containing water-soluble resin (A)". In addition, monomers having two or more polymerizable unsaturated bonds, for example polyethylene glycol dimethacrylate, ethylene glycol diacrylate and triallyl cyanurate, may also be used to give polymers having a crosslinked structure.

The above-mentioned monomer components (I) and (J) may respectively be used either singly or in combination as a mixture of two or more according to the quality and performance characteristics required of the final product.

The water-soluble resin (A) to serve as a dispersion stabilizer is used preferably in a proportion, relative to the total of monomers to be polymerized, of 1/20 to 1/0.3 by weight, more preferably 1/10 to 1/1 by weight.

When the above proportion is less than 1/20, the problem of decreased stability of polymerization will be often encountered. When said proportion exceeds 1/0.3, the water resistance of paint films will be low.

Generally, water is used as the aqueous medium for dissolving the component (A). In cases where the dispersant resin is used in the form dissolved in an organic solvent, the resulting system necessarily contains the organic solvent in an amount adequate for the dispersant resin. Furthermore, for increasing the solubility of the dispersant resin, for instance, a water-soluble organic solvent may be added in an amount not exceeding ½ of the amount of water.

The polymerization initiator (K) to be used may be any of those water-soluble or oil-soluble peroxides, azo initiators, redox initiators and so forth that are commonly used in radical polymerization. Among them, water-soluble initiators are preferred.

As typical water-soluble initiators, there may be mentioned, for instance, sodium persulfate, potassium persulfate, ammonium persulfate, hydrogen peroxide, tert-butyl peroxide, cumene hydroperoxide, azodiisobutyric acid diamide and the like peroxides, persulfates and azo compounds as well as redox initiators activated in the aqueous phase with a water-soluble reducing agent.

The polymerization initiator (K) mentioned above is used in an amount of 0.01 to 10 parts by weight, preferably 0.05 to 5 parts by weight, per 100 parts by weight of the total of monomers.

Those ionic or nonionic surfactants commonly used in emulsion polymerization may additionally be used. From the viewpoints of water resistance and weather resistance, among others, they should preferably be used only in small amounts. As examples of the ionic or nonionic surfactants, there may be mentioned potassium n-dodecylsulfonate, sodium isooctylbenzensulfonate, sodium laurate, polyethylene glycol nonylphenyl ether and the like.

The polymerization can be conducted within the polymerization temperature range of 30° to 90° C., preferably 40° C. to 80° C.

The thus-obtained aqueous dispersion composition contains ultrafine particles having a particle size of 0.02 to 0.7 μm and consequently has excellent film-forming ability.

In the practice of the invention, the solid content in the aqueous dispersion resin composition is within the range of 20 to 70% by weight.

When the solid content is above 70% by weight, troubles are very often produced, for instance, the viscosity of the system increases, so that the heat of polymerization can hardly be removed and a long time is required for discharging the reaction mixture from the polymerization vessel. When, conversely, the solid content is below 20% by weight, the polymerization procedure has no problem at all but the yield of the resin per polymerization procedure is small, hence marked economical disadvantages will result. From the users' requirement viewpoint as well, solid contents less than 20% by weight detrimentally affect the applicability; paint films have a thin thickness, so that they readily undergo deterioration in performance characteristics.

The aqueous dispersion composition mentioned above need not contain any curing catalyst. For promoting curing and for attaining physical properties as required, a curing catalyst may be incorporated in the composition.

Examples of the curing catalyst include, among others, organotin compounds such as dibutyltin dilaurate, dibutyltin maleate, dioctyltin dilaurate, dioctyltin maleate and stannous octoate; phosphoric acid and esters thereof, such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate; adducts from an epoxy compound, such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane, (3,4-epoxycyclohexyl)ethyltrimethoxysilane, or Cardura E, Epikote 828 or Epikote 1001 (each available from Yuka Shell Epoxy Kabushiki Kaisha), and phosphoric acid and/or an acidic monophosphate ester; organic titanate compounds; organic aluminum compounds, organic zirconium compounds; acidic compounds such as maleic acid, adipic acid, azelaic acid, sebacic acid, itaconic acid, citric acid, succinic acid, trimellitic acid, pyromellitic acid, anhydrides of these, and para-toluene-sulfonic acid; amines such as hexylamine, di-2-ethylhexylamine, N,N-dimethyldodecylamine and dodecylamine; mixtures of or reaction products from these amines and acidic phosphate esters; and alkaline compounds such as sodium hydroxide and potassium hydroxide.

Among the curing catalysts mentioned above, organotin compounds, acidic phosphate ester-amine mixtures or reaction products, saturated or unsaturated polybasic carboxylic acids or anhydrides thereof, reactive silicon compounds, organic titanate compounds, organic aluminum compounds, and mixtures of these have high activity and are preferred. More preferred are organotin compounds, acidic phosphate esters and acidic phosphate ester-amine mixtures or reaction products.

The curing catalysts may be used either singly or in combination. The amount of the curing catalyst is not critical. Generally, however, the catalyst is used preferably in a proportion of 0.01 to 20 parts by weight, more preferably 0.1 to 10 parts by weight, per 100 parts by weight of the solids in the aqueous dispersion composition. When the proportion exceeds 20 parts by weight, paint films tend to have an inferior appearance.

In the aqueous dispersion composition obtained, there may be incorporated, when necessary, additives generally used in paint compositions, for example pigments (white pigments such as titanium dioxide, calcium carbonate, barium carbonate and kaolin, color pigments such as carbon, red iron oxide and phthalocyanine blue), colloidal silica, film formation aids, plasticizers, solvents, dispersing agents, thickeners, defoamers, preservatives, ultraviolet absorbers and so on.

The composition of the invention is useful as a paint or coating composition or top face treatment composition for decorating or repairing the interior and exterior of buildings, for providing clear coatings onto metallic coats (for automobiles, etc.), for direct application to metals such as aluminum and stainless steel or to slates, concrete structures, roofing tiles, mortar surfaces, plasterboards, asbestos slates, asbestos boards, precast concrete structures, light-weight air-entrained concrete structures, calcium silicate boards, tiles, bricks and other ceramic articles, or for application to glass, natural marble, granite and stone articles and so forth. Said composition can be used also as an adhesive or the like.

Said composition can be blended with commercially available water paints, such as acrylic paints, thermosetting acrylic paints such as melamine-acrylic paints, alkyd paints, fluororesin paints and epoxy paints, to improve the weather resistance, acid resistance and solvent resistance of these paints.

It is also possible to render said composition fast-curing by incorporating thereinto a melamine resin and/or an isocyanate compound as a crosslinking agent.

EXAMPLES

The following examples further illustrate the composition of the invention and the method of preparing or producing the same.

Production Examples for water-soluble resins (A) ([A-1] to [A-8])

A reaction vessel equipped with a stirrer, a thermometer, a reflux condenser, a nitrogen gas inlet and a dropping funnel was charged with 60 parts of dipropylene glycol monobutyl ether (Dowanol DPnB, trademark; product of Dow Chemical Company) (in the case of [A-1] to [A-3]) or 60 parts of butyl cellosolve (in the case of [A-5] to [A-7]) or 60 parts of isopropyl alcohol (in the case of [A-4] and [A-8]). While nitrogen gas was introduced into the vessel, the temperature of the charge was raised to 75° C. and a mixture having the composition specified below in Table 1 or Table 2 was added dropwise from the dropping funnel at a constant rate over 5 hours.

TABLE 1

| Mixture composition | A-1 | A-2 | A-3 | A-4 |
|---|---|---|---|---|
| Butyl acrylate | 20 | 20 | 20 | 20 |
| Methyl methacrylate | 60 | 65 | 70 | 60 |
| γ-Methacryloxypropyl-trimethoxysilane | 10 | 5 | 0 | 10 |
| Acrylic acid | 10 | 10 | 10 | 10 |
| 2,2'-Azobis-2,4-dimethyl-valeronitrile | 3 | 3 | 3 | 3 |
| Viscosity (cP, 23° C., 50 wt %) | 30 | 28 | 30 | 26 |

TABLE 2

| Mixture composition | A-5 | A-6 | A-7 | A-8 |
|---|---|---|---|---|
| Butyl acrylate | 20 | 20 | 20 | 20 |
| Methyl methacrylate | 60 | 65 | 70 | 60 |
| γ-Methacryloxypropyl-trimethoxysilane | 10 | 5 | 0 | 10 |
| N,N-Dimethylaminoethyl methacrylate | 10 | 10 | 10 | 10 |
| 2,2'-Azobis-2,4-dimethyl-valeronitrile | 3 | 3 | 3 | 3 |
| Viscosity (cP, 23° C., 50 wt %) | 26 | 28 | 28 | 26 |

After completion of the dropping, aging was conducted at 75° C. for 2 hours. After addition of 8.5 parts by weight of ammonia (in the case of [A-1] to [A-4]) or 2 parts by weight of glacial acetic acid (in the case of [A-5] to [A-8]), the aged mixture was cooled. The water-soluble resin thus obtained had a number average molecular weight of 6,000.

The solid content was adjusted to 60% by weight by adding dipropylene glycol monobutyl ether (Dowanol DPnB; Dow Chemical Company) (in the case of [A-1] to [A-3]) or butyl cellosolve (in the case of [A-5] to [A-7]) or isopropyl alcohol (in the case of [A-4] and [A-8]) to the resin solution.

Examples 1 to 4 and Comparative Examples 1 to 4

(Synthesis of aqueous dispersion compositions)

A reaction vessel equipped with a stirrer, a thermometer, a reflux condenser, a nitrogen gas inlet and a dropping funnel was charged with 93 parts by weight of deionized water, followed by addition of 1 part by weight of ascorbic acid and 0.1 part by weight of ferrous sulfate. Then, 18.5 parts by weight of one of the resin solutions [A-1] to [A-8] obtained in the above production examples was added and the mixture was thoroughly stirred for effecting dissolution and, while introducing nitrogen gas into the vessel, the charge temperature was raised to 70° C. and a mixture having the composition specified below was added dropwise from the dropping funnel at a constant rate over 5 hours.

(Mixture)

| | |
|---|---|
| Styrene | 20 weight parts |
| Butyl acrylate | 20 weight parts |
| Methyl methacrylate | 55 weight parts |
| γ-Methacryloxypropyltrimethoxysilane | 5 weight parts |
| Cumene hydroperoxide | 1 weight part |

After completion of the addition of the above mixture, aging was conducted at 70° C. for 2 hours and, after cooling, deionized water was added to the aqueous dispersion to thereby adjust the solid content to 50% by weight.

Each aqueous dispersion composition thus obtained was tested for lowest film-forming temperature. Further, this aqueous dispersion composition was applied to an epoxy sealer-coated slate board and cured and, on the other hand, said composition was molded into a film and cured (in each case, 1 part, per 100 parts of the resin solid, of dibutyltin dilaurate was used as a curing catalyst). Both cured products were tested for gloss, water resistance, weather resistance, alkali resistance, acid resistance and gel fraction.

The results thus obtained are shown in Table 3 and Table 4.

TABLE 3

| | Example 1 | Example 2 | Comparative Example 1 | Comparative Example 2 |
|---|---|---|---|---|
| Water-soluble regain used | A-1 | A-2 | A-3 | A-4 |
| Lowest film-forming temperature (°C.) | 5 | 5 | 5 | 45 |
| Gloss (60° gloss) | 88 | 87 | 85 | 70 |
| Water resistance (Note 1) | 10 | 10 | 2 | 5 |
| Accelerated weathering resistance (Note 2) | o | o | x | Δ |
| Alkali resistance (Note 3) | 10 | 10 | 3 | 6 |
| Acid resistance (Note 4) | 10 | 10 | 2 | 6 |
| Gel fraction (%) (Note 5) | 94 | 90 | 0 | 80 |

(Note 1) The film-shaped molding was immersed in water at room temperature for 1 month and then evaluated for change in gel fraction by rating on 10 levels. The greater the number is, the higher the water resistance is.
(Note 2) After 1,000 hours of weathering in a Sunshine weatherometer, the paint film was examined for change.
o: Good;
Δ: Minor defects on paint film;
x: Bad.
(Note 3) After 1-month immersion in 5% aqueous sodium hydroxide at room temperature, the change in gel fraction was rated on 10 levels.
(Note 4) After 1-month immersion in 5% hydrochloric acid at room temperature, the change in gel fraction was rated on 10 levels.
(Note 5) Acetone-insoluble fraction, namely weight percent after immersion of the paint film in acetone.

TABLE 4

| | Example 3 | Example 4 | Comparative Example 3 | Comparative Example 4 |
|---|---|---|---|---|
| Water-soluble resin used | A-5 | A-6 | A-7 | A-8 |
| Lowest film-forming temperature (°C.) | 5 | 5 | 5 | 45 |
| Gloss (60° gloss) | 85 | 80 | 80 | 70 |
| Water resistance (Note 1) | 10 | 10 | 3 | 4 |
| Accelerated weathering resistance (Note 2) | o | o | x | Δ |
| Alkali resistance (Note 3) | 10 | 10 | 2 | 5 |
| Acid resistance (Note 4) | 10 | 10 | 2 | 5 |
| Gel fraction (%) (Note 5) | 90 | 88 | 0 | 82 |

The evaluation results shown in Table 3 and Table 4 lead to the following conclusions:

By employing the present invention in producing aqueous dispersion compositions, the possibility of gelation during emulsion polymerization can be eliminated.

The composition of the invention, in spite of its comprising a resin having a relatively high glass transition temperature, has a low minimum film-forming temperature and can form good paint films even at ordinary temperature. It has excellent storage stability, hence there is no need to worry about gelation during storage.

Furthermore, cured products (paint films) obtained from the composition of the present invention is excellent in durability as expressed in terms of water resistance, weather resistance, alkali resistance and acid resistance, among others, and thus have markedly improved performance characteristics as compared with the conventional water paints.

We claim:

1. An aqueous dispersion composition obtained by subjecting a monomer mixture (B) containing a vinyl monomer having a functional silyl group of the general formula

to emulsion polymerization in an aqueous solution of a water-soluble resin (A) containing a functional silyl group of the general formula

the water-soluble resin (A) being synthesized using a polymerization solvent, the polymerization solvent being a water-soluble solvent comprising a (poly)ethylene glycol monoalkyl ether of the general formula HO—$(CH_2CH_2O)_n$—$R^3$ or a (poly)propylene glycol monoalkyl ether of the general formula HO—$(C_3H_6O)_n$—$R^4$ ($C_3H_6$ being a propylene group), wherein, in the above formulas, $R^1$ and $R^2$ each independently is a monovalent group selected from the class consisting of alkyl groups containing 1 to 10 carbon atoms, aryl groups and aralkyl groups, X is a group selected from the class consisting of halogen atoms, alkoxy groups, a hydroxy group, acyloxy groups, an aminoxy group, a phenoxy group, thioalkoxy groups and an amino group, a and b each independently is an integer of 0 to 2, $R^3$ and $R^4$ each is an alkyl group containing 1 to 10 carbon atoms and n is an integer of 1 to 10 and wherein, when two or more $R^1$ and/or $R^2$ or X groups are bound to Si, they respectively may be the same or different; the water-soluble resin (A) being rendered soluble in water by incorporating a monomer selected from the group consisting of a carboxyl-containing monomer and a basic group-containing monomer; the carboxyl or basic group of the water-soluble resin (A) being neutralized.

2. The aqueous dispersion composition of claim 1, wherein the carboxyl or basic group of water-soluble resin (A) is neutralized with using ammonia or an organic amine compound.

3. A paint composition comprising as a main resinous component the aqueous dispersion composition of claim 1.

4. A composition according to claim 1 having a solids content consisting of emulsion polymer formed by said emulsion polymerization.

5. A composition according to claim 2 having a solids content consisting of emulsion polymer formed by said emulsion polymerization.

6. A composition according to claim 3 having a solids content consisting of emulsion polymer formed by said emulsion polymerization.

* * * * *